Nov. 24, 1925.                                                                          1,563,197
                            O. J. LASHER
                    MEAT MARKET REFRIGERATOR
                  Filed Feb. 28, 1925        3 Sheets-Sheet 1

INVENTOR
                                                              Osmer J. Lasher
                                                              BY
                                                                 H. G. Manning
                                                                       ATTORNEY Nov. 24, 1925.

O. J. LASHER 1,563,197

MEAT MARKET REFRIGERATOR

Filed Feb. 28, 1925      3 Sheets-Sheet 2

INVENTOR
Osmer J. Lasher
BY
H. G. Manning
ATTORNEY

Nov. 24, 1925.
O. J. LASHER
MEAT MARKET REFRIGERATOR
Filed Feb. 28, 1925
1,563,197
3 Sheets-Sheet 3
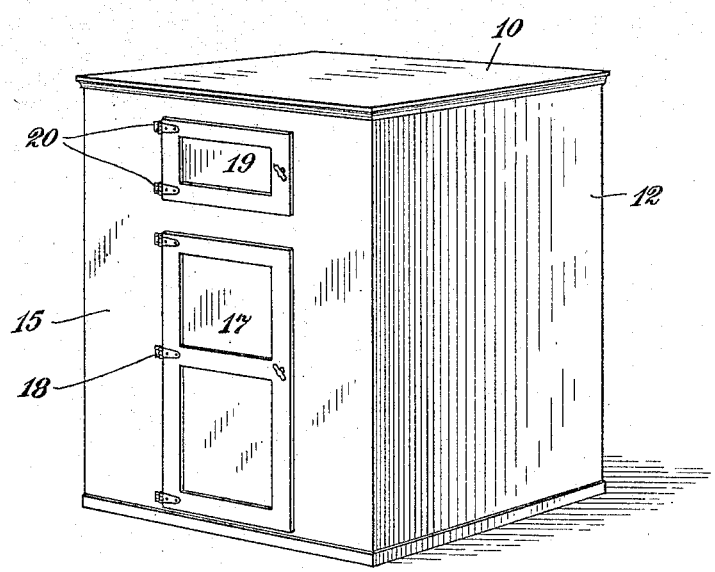
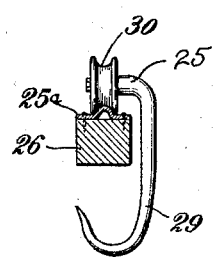
INVENTOR
Osmer J. Lasher
BY
H. G. Manning
ATTORNEY Patented Nov. 24, 1925.

1,563,197

UNITED STATES PATENT OFFICE.

OSMER J. LASHER, OF WATERBURY, CONNECTICUT.

MEAT-MARKET REFRIGERATOR.

Application filed February 28, 1925. Serial No. 12,307.

*To all whom it may concern:*

Be it known that I, OSMER J. LASHER, a citizen of the United States, and a resident of Waterbury, county of New Haven, and State of Connecticut, have invented certain new and useful Improvements in Meat-Market Refrigerators, of which the following is a specification.

This invention relates to refrigerators and more particularly to a refrigerator to be used in meat markets.

One object of this invention is to provide a device of the above nature in which the air is cooled partly by block ice and partly by a freezing mixture.

A further object is to provide a device of this nature in which the air in the refrigerator will be still further cooled by the use of brine tanks which are adapted to receive the spent brine produced by the melting of the freezing mixture.

A further object is to provide a meat market refrigerator of the above nature which will be relatively simple in construction, inexpensive to manufacture, easy to install and manipulate, and very efficient and durable in use.

With these and other objects in view, there has been illustrated on the accompanying drawings, one form in which the invention may be conveniently embodied in practice.

Fig. 3 is a perspective view of the same.

Fig. 4 is a detail sectional view of the meat hook and the track upon which it rolls.

Figure 1:
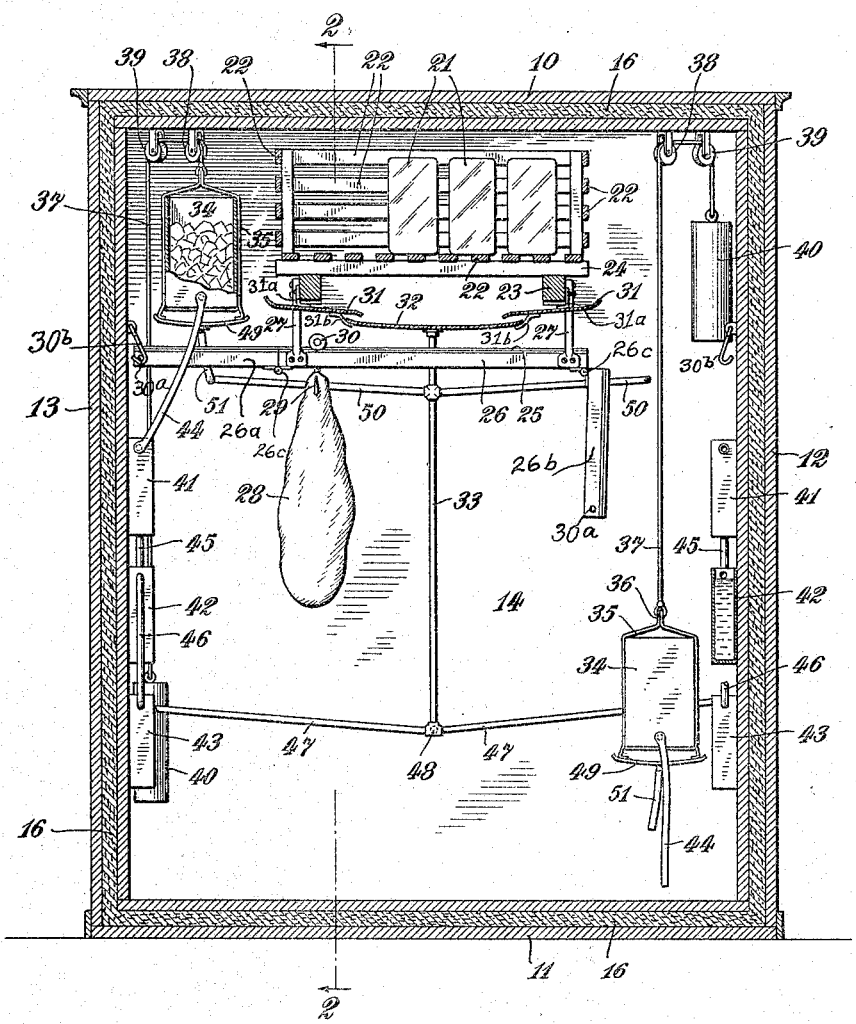
Fig. 1 represents a transverse sectional view of the improved meat market refrigerator.

Referring now to the drawings in which like reference numerals denote corresponding parts throughout the several views, the meat refrigerator herein illustrated comprises an outer casing composed of a top wall or roof 10, a bottom wall or floor 11, side walls 12 and 13, a rear wall 14, and a front wall 15. As will be clearly seen from Figs. 1 and 2 of the drawing, the walls of the casing are hollow and are filled with mineral wool, cork, or any other suitable heat insulating material.

In order to permit easy access to the refrigerator, the front wall 15 thereof is provided with a main entrance door 17 mounted upon hinges 18, and an upper charging door 19 mounted on hinges 20, said charging door permitting blocks of ice 21 to be readily passed into the refrigerator.

The ice blocks 21 are adapted to be received in an open rack or frame 22 comprising a series of horizontal slats, the bottom of said rack being located just below the level of the charging door 19. The slats are supported upon a plurality of beams 24, seven in this instance, said beams 24 in turn resting upon a pair of heavy cross pieces 23 having their ends seated in angular brackets 24$^a$ secured to the front and rear walls 14 and 15 of the refrigerator casing.

Figure 2:
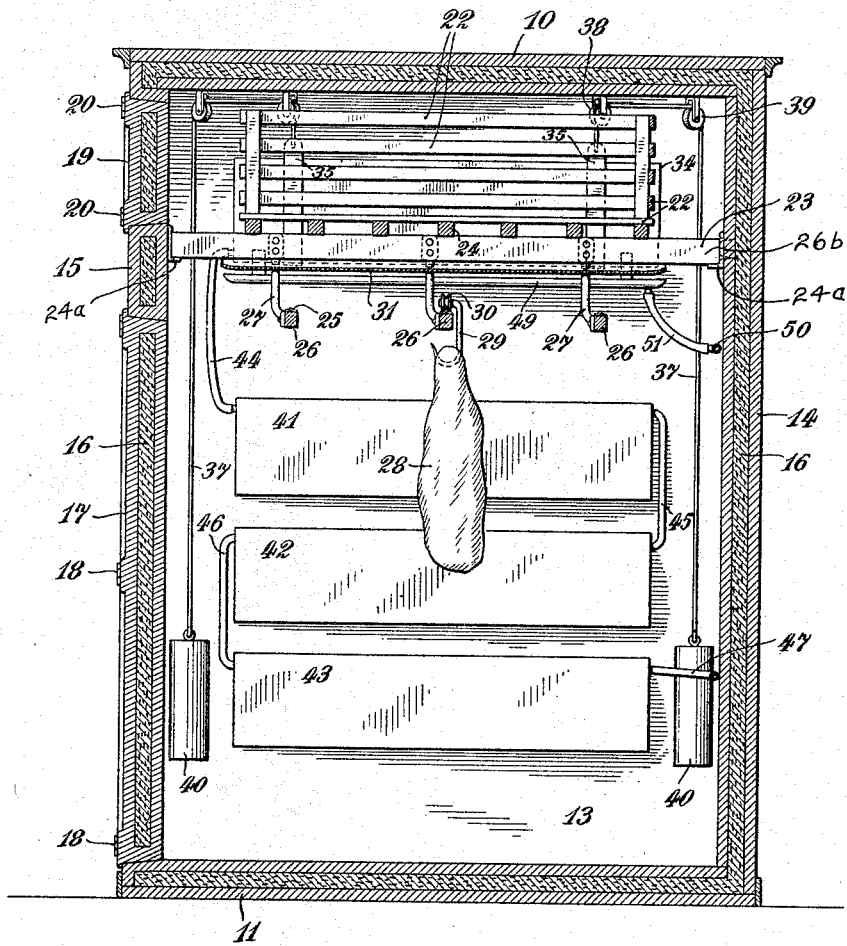
Fig. 2 is a longitudinal sectional view of the same.

In order to permit articles of meat to be movably supported within the refrigerator, provision is made of a plurality of rails or tracks 26, three in this instance, said tracks being supported on depending hangers 27 secured at suitable intervals to the cross pieces 23. Each of the tracks 26 is provided on its top surface with metal strips 25$^a$, said strips having central ribs adapted to guide the rollers 30. The tracks 26 have movable end sections 26$^a$ and 26$^b$ connected to the middle portion of said tracks by hinges 26$^c$. By means of this construction, the ends of the tracks may be swung down to vertical position, as shown in Fig. 1. The ends of said tracks have laterally projecting pins 30$^a$ adapted to be engaged by hooks 30$^b$ pivoted to the side walls 12 and 13 respectively.

The articles of meat, one of which is represented herein by the numeral 28, are supported upon meat hooks 29 having horizontal upper portions 25 upon which rollers 30 are journaled, said rollers being adapted to ride on the tracks 26.

The drippings from the block ice rack 22 are caught by a pair of side drip pans 31 and a central drip pan 32 located slightly below said side drip pans, spaces being left therebetween to allow a free circulation of air. The side drip pans 31 are connected to the cross pieces 23 by suitable lugs 31$^a$, and the central drip pan 32 is connected to the side pans 31 by lugs 31$^b$. The central drip pan is drained by a pipe 33 located along the rear wall of the casing.

In order to supplement the cooling effect of the block ice in the refrigerator, a pair of freezing mixture chambers 34 are located at either side of the frame 22. The chambers 34 are open at their top and are adapted to contain a mixture of cracked ice and salt or any other suitable freezing mixture.

Each of the chambers 34 is suspended at both of its ends by hangers 35 of strip metal or other suitable material encircling said chambers. The ends of said hangers are brought together at 36 above the chambers 34 and are apertured to receive a cord 37, the end of said cord being looped through the apertures in the abutting ends of said hangers 35.

The cord 37 passes upwardly over a pulley 38, then horizontally in a diagonal direction toward the rear corners of the casing where it passes over a second pulley 39. Each of the cords 37 has a counter-weight 40 connected to its lower end, said counterweights being so located along the walls of the casing that they will not interfere with the chambers 34, or with the brine tanks, to be hereinafter described. The pulleys 38 and 39 are adapted to be permanently secured to the roof of the casing 10.

In order to still further increase the cooling effect in the refrigerator, each of the side walls 12 and 13 is provided with a plurality of horizontal rectangular brine tanks 41, 42, and 43, said brine tank 41 being adapted to receive the drainings from the spent freezing mixture in the chambers 34 by means of a flexible hose section 44. The over-flow from the tank 41 is adapted to pass through a metal pipe 45 to the middle brine tank 42, and the over-flow from said middle tank 42 is conducted through a pipe 46 to the bottom brine tank 43. After passing through all three of the tanks 41, 42, and 43, the spent brine is carried through a pair of pipes 47 and thence out of the casing to the sewer through a pipe 48, said pipe 48 also receiving the melted block ice which drains from the frame 22.

In order to collect moisture which may condense on the exterior surface of the freezing mixture chambers 34, suitable drip pans 49 are provided, said drip pans 49 being connected by detachable hose sections 51 to pipes 50 leading to the vertical pipe 33.

In operation, when it is desired to replenish the supply of block ice and freezing mixture, the operator will first open the upper charging door 19 and will insert the desired amount of block ice in the rack 22. The operator will then enter the refrigerator through the main entrance door 17 and will disconnect the flexible hose sections 44 and 51 of one of the chambers 34. He will pull said chamber 34 down to the bottom of the casing against the force of the counterweights 40, and will then replenish the chamber with freezing mixture, after which he will again push it upwardly into the position shown at the left of Fig. 2. The flexible hose connections 44 and 51 will then be rejoined to the upper brine tank 41 and the pipe 50 respectively. The operator will then proceed to fill the other chamber 34 in a similar manner. As will be understood, the counterweights 40 must be sufficiently heavy to hold the chamber 34 in raised position while it has a full load of freezing mixture.

It will also be understood that this invention is not only applicable to new meat refrigerators, but may be installed in old refrigerators as an attachment at any time.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a meat market refrigerator, a casing, said casing containing a receptacle for block ice, said receptacle being spaced from the side walls of said casing, an auxiliary chamber in said casing for a freezing mixture, and means to permit said auxiliary chamber to be charged with a freezing mixture by an operator standing beneath said receptacle, said block ice receptacle and auxiliary chamber being located near the roof of said casing.

2. In a meat market refrigerator, a casing, the upper part of said casing containing a receptacle for block ice, a movable auxiliary chamber alongside said receptacle in said casing for a freezing mixture, means to permit said receptacle and said chamber to be charged with block ice and a freezing mixture respectively, and means for temporarily lowering said auxiliary chamber to permit it to be recharged when it has become empty, the air in said refrigerator circulating down around said auxiliary chamber and up around said block ice.

3. In a meat market refrigerator, a casing, the upper part of said casing containing a fixed receptacle for block ice, a movable auxiliary chamber alongside said receptacle in said casing for a freezing mixture, means to permit said receptacle and said chamber to be charged with block ice and a freezing mixture respectively, and a brine tank located along the side of said casing for receiving the spent freezing mixture from said chamber, whereby all of the cooling effect of said mixture will be utilized.

4. In a meat market refrigerator, a casing, a receptacle for block ice located in said casing at the top thereof, an auxiliary chamber for a freezing mixture located in said casing alongside said receptacle, and manually-operated means for lowering said chamber to permit an operator standing beneath said receptacle to replenish the freezing mixture, the circulation of air in said casing being up around said block ice and down around said auxiliary chamber.

5. In a meat market refrigerator, a casing, said casing containing a receptacle for block ice, means for permitting said receptacle to be replenished, an auxiliary chamber for a freezing mixture movably mounted in said casing and normally located near the roof thereof alongside said receptacle, and manually operated means for temporarily lowering said chamber so that it may be conveniently replenished from the floor of said casing, and a counterweight for automatically maintaining said chamber in operating position at the top of said casing.

6. In a meat market refrigerator, a casing, said casing containing a receptacle for block ice, an auxiliary chamber for a freezing mixture movably mounted in said casing and normally located near the roof thereof alongside said receptacle, said chamber being encircled by a supporting hanger, a flexible cord having one end attached to the supporting hanger, a pulley secured to the roof of said casing, said cord passing over said pulley and having a counter-weight connected to the other end for maintaining said chamber in operative position at the top of the casing.

In testimony whereof, I have affixed my signature to this specification.

OSMER J. LASHER.